United States Patent
Jules et al.

(10) Patent No.: US 9,844,877 B1
(45) Date of Patent: Dec. 19, 2017

(54) GENERATING A PARAMETER FOR A MOVEMENT CHARACTERISTIC FOR A WAYPOINT TRAINED PATH OF A ROBOT

(71) Applicant: X Development LLC, Mountain View, CA (US)

(72) Inventors: Anthony Sean Jules, Oakland, CA (US); Johan Ulrich Lewin Jessen, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 218 days.

(21) Appl. No.: 14/799,511

(22) Filed: Jul. 14, 2015

(51) Int. Cl.
B25J 9/16 (2006.01)

(52) U.S. Cl.
CPC ... B25J 9/1664 (2013.01); *G05B 2219/40448* (2013.01)

(58) Field of Classification Search
CPC ...... B25J 9/1664; B25J 9/1671; B25J 9/1651; B25J 9/1653
See application file for complete search history.

(56) References Cited

U.S. PATENT DOCUMENTS

| | | | |
|---|---|---|---|
| 5,880,956 | A | 3/1999 | Graf |
| 7,292,913 | B2 | 11/2007 | Tokutake et al. |
| 8,260,460 | B2 | 9/2012 | Sanders et al. |
| 8,321,054 | B2 | 11/2012 | Selnes et al. |
| 8,843,236 | B2 | 9/2014 | Barajas et al. |
| 8,965,576 | B2 | 2/2015 | Chen et al. |
| 8,996,174 | B2 | 3/2015 | Brooks et al. |
| 9,186,795 | B1 * | 11/2015 | Edsinger ............... B25J 9/1694 |
| 2014/0358284 | A1 | 12/2014 | Laurent et al. |
| 2014/0371912 | A1 | 12/2014 | Passot et al. |
| 2015/0025684 | A1 * | 1/2015 | Negishi .................. B25J 9/1664 700/261 |
| 2015/0336267 | A1 * | 11/2015 | Sun ......................... B25J 9/163 700/161 |
| 2015/0336268 | A1 * | 11/2015 | Payton .................... B25J 9/163 700/261 |

FOREIGN PATENT DOCUMENTS

WO 2011039542 9/2010

OTHER PUBLICATIONS

Akgun, B., et al., Keyframe-Based Learning from Demonstration. International Journal of Social Robotics, 2012; 12 pages.
Iba, Soshi, Christiaan JJ Paredis, and Pradeep Khosla. "Interactive Multi-Modal Robot Programming." School of Computer Science at Research Showcase @ CMU. (2004). http://repository.cmu.edu/cgi/viewcontent.cgi?article=1504&context=isr, 11 pages.
Argall, Brenna D., et al. "A survey of robot learning from demonstration." Robotics and autonomous systems 57.5 (2009): pp. 469-483.

* cited by examiner

*Primary Examiner* — Adam R Mott
(74) *Attorney, Agent, or Firm* — Middleton Reutlinger

(57) ABSTRACT

Methods, apparatus, systems, and computer-readable media are provided for training a path of a robot within a graphical user interface (GUI) and/or by physically moving the robot. In particular, the technology generates a trained path for the robot based on waypoints defined by a user and generates one or more parameters for one or more movement characteristics of the robot along the trained path. The parameters for the movement characteristics are generated based on spatial proximity of a plurality of the waypoints that are defined by the user.

22 Claims, 8 Drawing Sheets

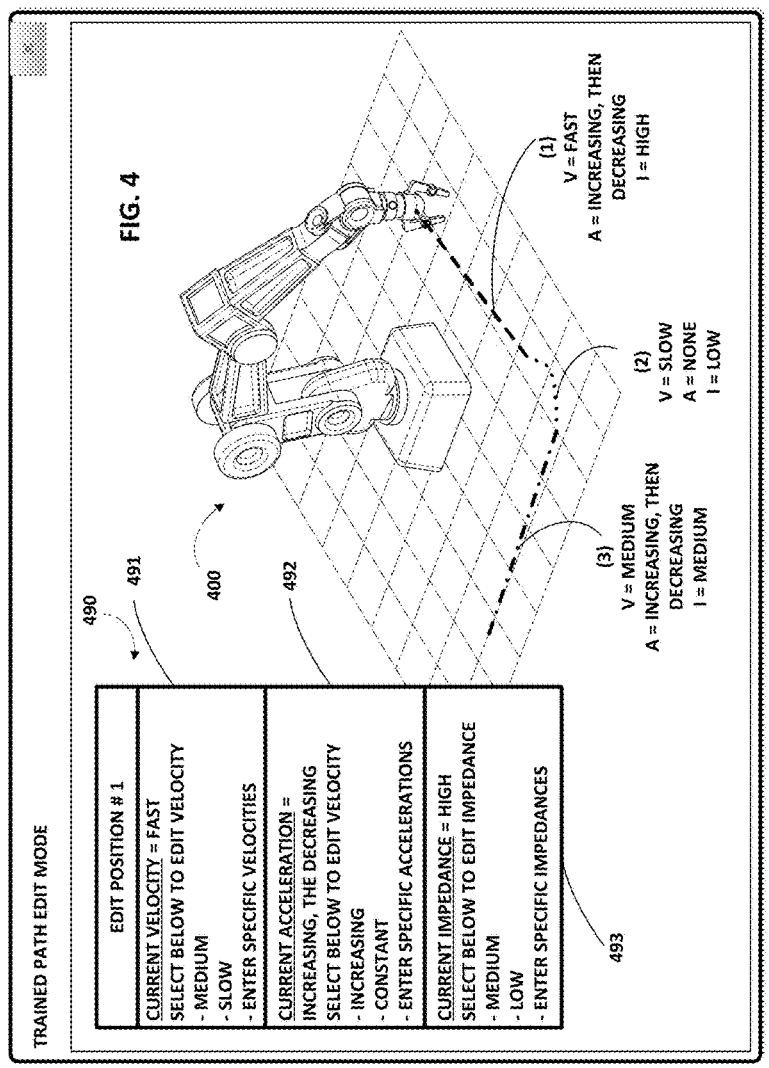

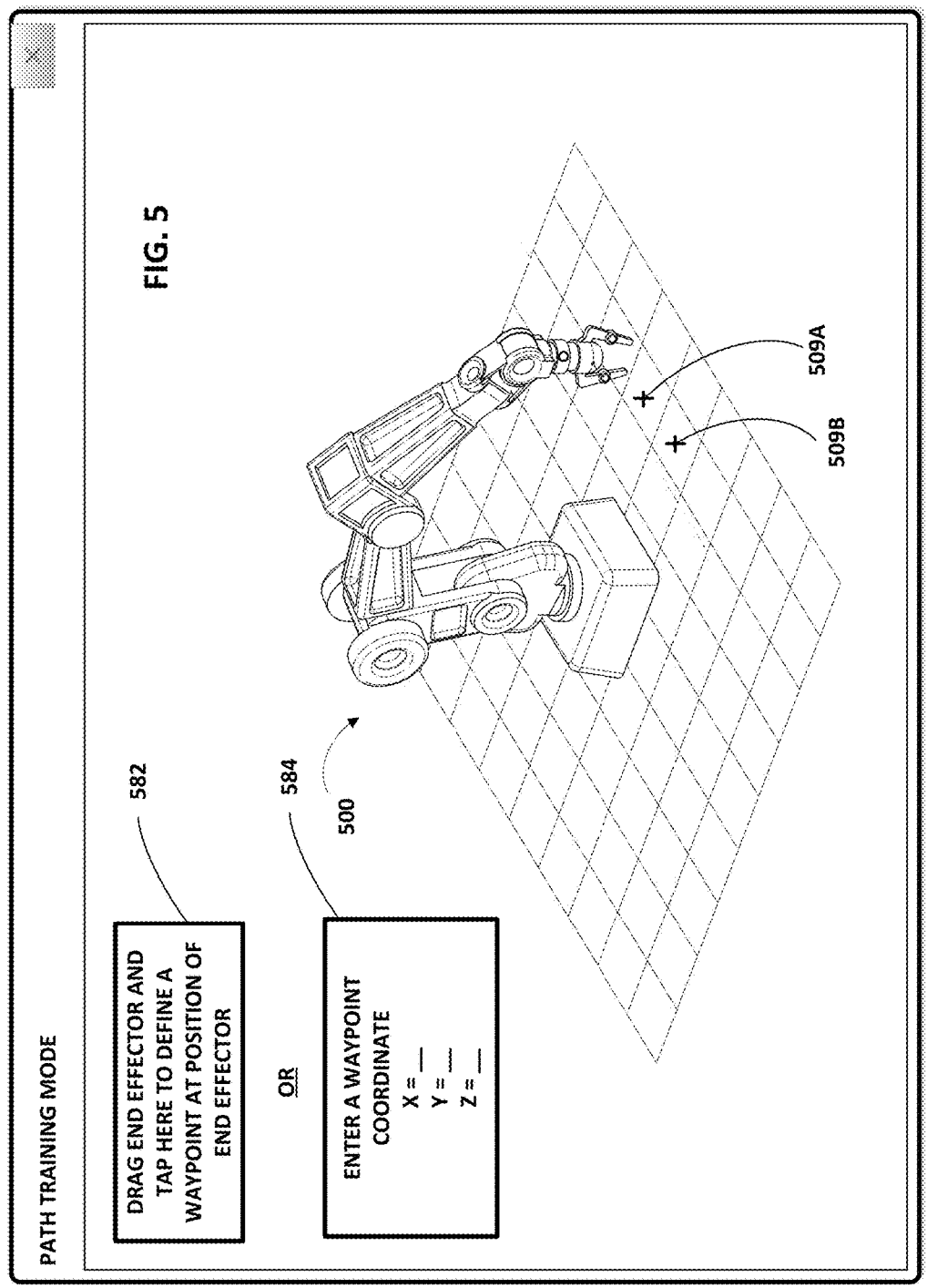

GENERATING A PARAMETER FOR A MOVEMENT CHARACTERISTIC FOR A WAYPOINT TRAINED PATH OF A ROBOT

BACKGROUND

Robots may be programmed to perform a variety of tasks and often must traverse one or more paths in performing programmed tasks. For example, to retrieve an object and place the object in a container, an end effector of a robot must traverse a first path to reach a pick up location for the object, then after picking up the object must traverse a second path to reach a location for placing the object in the container.

Various techniques may be employed for determining a path to be traversed by a robot in performance of a task. For example, some robots may be configured to automatically determine an appropriate path for performing a task based on sensed environmental conditions and/or other factors. For instance, some robots may determine a path to an object based on detecting a position of the object, then using a path planner to determine the shortest path to reach the position of the object. Also, for example, some paths may be determined based on "learning" the paths in response to the user physically manipulating the robot. As yet another example, some paths may be determined based on the user explicitly defining the path via a robot programming application. However, some techniques for determining learned paths and/or explicitly defining paths may lack the ability for a user to define parameters for movement characteristics for those paths and/or may require tedious extra steps to define the parameters that are in addition to steps required to define the paths.

SUMMARY

The present disclosure is generally directed to training a path of a robot within a graphical user interface (GUI) and/or by physically moving the robot. In particular, the technology generates a trained path for the robot based on waypoints defined by a user and generates one or more parameters for one or more movement characteristics of the robot along the trained path. The parameters for the movement characteristics are generated based on spatial proximity of a plurality of the waypoints that are defined by the user.

Generally, a trained path defines a path to be traversed by a reference point of the robot, such as a path to be traversed by a reference point of an end effector of the robot. Movement characteristics along a trained path may include, for example, velocity, acceleration, and/or mechanical impedance (i.e., "stiffness" of the robot) along the path. A movement characteristic along a trained path is distinct from the trained path itself. A generated parameter for a movement characteristic defines a subset of achievable parameters for the movement characteristic along at least a portion of the waypoint trained path. In other words, the generated parameter for a movement characteristic is not strictly mandated by the portion of the waypoint trained path in view of robot constraints. Rather, the generated parameter is a subset of multiple parameters that could be defined for the portion of the waypoint trained path in view of robot constraints. The generated parameter is a parameter that is in addition to positional coordinates of the trained path and robot actuator positions to achieve that trained path. For example, a generated parameter for a velocity movement characteristic along a trained path indicates one or more rates of change of the positional coordinates of the trained path and/or the rate(s) of change of the robot actuator positions to achieve that trained path.

The trained path and/or the parameters for movement characteristics may be defined in Cartesian space (i.e., the path and/or parameters as traversed by the reference point) and/or in joint space (i.e., the robot actuator positions and/or parameters (e.g., rates of position change, impedance) that cause the reference point to traverse the path with the parameters).

As described above, the parameter of a movement characteristic along one or more portions of a trained path may be generated based on spatial proximity of a plurality of the waypoints defined by the user. For example, where the movement characteristic is velocity, the parameter may define the velocity along a portion of the path such as a fast, medium, or slow velocity or a more particularly defined velocity such as 5.0 m/s. Also, for example, where the movement characteristic is acceleration, the parameter may define the acceleration along a portion of the path such as no acceleration, decreasing acceleration or decreasing deceleration, increasing acceleration or increasing deceleration, a constant acceleration or deceleration, or a more particularly defined acceleration or deceleration such as 1.0 m/s$^2$. It is noted that in some implementations one or more parameters for acceleration along a path may be defined implicitly by defining one or more parameters for velocity. Likewise, one or more parameters for velocity may be defined implicitly by defining one or more parameters for acceleration. Also, for example, where the movement characteristic is mechanical impedance, the parameter may define the mechanical impedance along a portion of the path such as a high, medium, or low impedance or a more particularly defined impedance.

As one example, a user may physically move a robot arm and "tap" a button (e.g., a physical button on the robot arm) to define waypoints and a trained path may be generated based on the defined waypoints. For instance, the user may, while physically manipulating one or more components of a robot to move an end effector of the robot, tap the button at four different locations of the end effector to define four different waypoints for a path being trained. A trained path may then be determined using the four waypoints as guides (e.g., to ensure the four waypoints are encountered or "nearly" encountered by the reference point of the end effector along the trained path), while using one or more techniques (e.g., shortest distance or shortest time) to determine the particular path between the waypoints. Moreover, parameters for movement characteristics along the determined path may be generated based on proximity of the four waypoints. For instance, if the four taps/waypoints were recorded within six inches of one another a "slow" parameter for a velocity movement characteristic along that portion of the path may be generated, whereas if the four taps/waypoints were recorded over five feet, a "medium" or "fast" parameter for a velocity movement characteristic along that portion of the path may be generated.

In some implementations, mapping(s) and/or formula(e) may be utilized to determine a parameter for a movement characteristic that is appropriate for a given proximity of waypoints. For example, the number of waypoints over a given portion of a path may be divided by the collective distance between those waypoints to determine a waypoint "density", and the waypoint density may be mapped to various movement parameters.

Generated parameters for movement characteristics may be automatically assigned to a respective portion of the trained path and/or presented to the user for confirmation or alteration. The generated parameters may then be utilized by the robot to traverse the waypoint trained path. For example, control commands may be generated by a robot to cause actuators of the robot to traverse the path in accordance with a generated parameter for a velocity movement characteristic.

In some implementations, a method may be provided that includes the steps of: identifying a plurality of sequential waypoint user interface inputs initiated by a user and generating a waypoint trained path for the robot based on the sequential waypoints defined by the waypoint user interface inputs. The waypoint user interface inputs define waypoints of a reference point of a robot and the waypoint trained path defines a path to be traversed by the reference point of the robot. The method further includes the step of generating at least one parameter for a movement characteristic for the waypoint trained path. The parameter defines the movement characteristic along a portion of the waypoint trained path and generating the parameter is based on spatial proximity of a plurality of the waypoints corresponding to the portion of the waypoint trained path.

This method and other implementations of technology disclosed herein may each optionally include one or more of the following features.

In some implementations, the movement characteristic is selected from the group consisting of velocity, acceleration, and mechanical impedance.

In some implementations, the movement characteristic is velocity and generating the parameter is based on the spatial proximity of at least a first waypoint of the waypoints to a second waypoint of the waypoints. In some of those implementations, the generated parameter of the velocity when the first waypoint is a first distance from the second waypoint is indicative of a greater velocity than when the first waypoint is a second distance from the second waypoint, the first distance being greater than the second distance.

In some implementations, the movement characteristic is acceleration and generating the parameter is based on the spatial proximity of at least a first waypoint of the waypoints to a second waypoint of the waypoints. In some of those implementations, the generated parameter of the acceleration when the first waypoint is a first distance from the second waypoint is indicative of a greater acceleration than when the first waypoint is a second distance from the second waypoint, the first distance being greater than the second distance.

In some implementations, the movement characteristic is mechanical impedance and generating the parameter is based on the spatial proximity of at least a first waypoint of the waypoints to a second waypoint of the waypoints. In some of those implementations, the generated parameter of the mechanical impedance when the first waypoint is a first distance from the second waypoint is indicative of greater mechanical impedance than when the first waypoint is a second distance from the second waypoint, the first distance being greater than the second distance. In some other of those implementations, the generated parameter of the mechanical impedance when the first waypoint is a first distance from the second waypoint is indicative of less mechanical impedance than when the first waypoint is a second distance from the second waypoint, the first distance being greater than the second distance.

In some implementations, the method further includes generating an additional parameter for the movement characteristic along an additional portion of the waypoint trained path and generating the additional parameter is based on the spatial proximity of the waypoints corresponding to the additional portion. At least one of the waypoints corresponding to the additional portion is in addition to the waypoints corresponding to the portion.

In some implementations, the method further includes generating an additional parameter for an additional movement characteristic along the portion of the waypoint trained path. Generating the additional parameter is based on the spatial proximity of the plurality of the waypoints corresponding to the portion of the waypoint trained path. In some of those implementations, the movement characteristic is one of velocity and acceleration and the additional movement characteristic is mechanical impedance.

In some implementations, the portion is the entirety of the waypoint trained path.

In some implementations, the parameter is a non-numerical descriptor.

In some implementations, generating the waypoint trained path includes determining a plurality of position values that define positions of the reference point along the waypoint trained path. In some of those implementations, generating the parameter includes associating the parameter with a plurality of the position values that correspond to the portion of the waypoint trained path.

In some implementations, generating the waypoint trained path and generating the parameter includes generating a plurality of vectors that collectively define the waypoint trained path and the parameter along the portion of the waypoint trained path, each of the vectors defining a state for each of a plurality of actuators of the robot.

In some implementations, each of the waypoint user interface inputs initiated by the user is in response to actuation by the user of a user interface element following physical manipulation of the robot by the user to move a reference point of the robot to a respective of the waypoints. In some of those implementations, the user interface element is on an exposed exterior surface of the robot.

In some implementations, each of the waypoint user interface inputs initiated by the user is in response to user interface input by the user via a graphical programming application.

In some implementations, generating the waypoint trained path includes: determining a plurality of position values of the waypoint trained path based on the waypoints defined by the waypoint user interface inputs, and determining intermediate position values of the waypoint trained path based on one or more optimization parameters.

In some implementations, the method further includes traversing, by the robot, a reference point of the robot along the portion of the waypoint trained path according to the parameter of the movement characteristic.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates an example graphical interface for editing the parameters of movement characteristics for the waypoint trained path of FIG. 3B.

FIG. 5 illustrates an example graphical interface that enables a user to provide user interface inputs that define waypoints for a robot, and illustrates two example waypoints defined via the graphical interface.

DETAILED DESCRIPTION

Figure 1A:
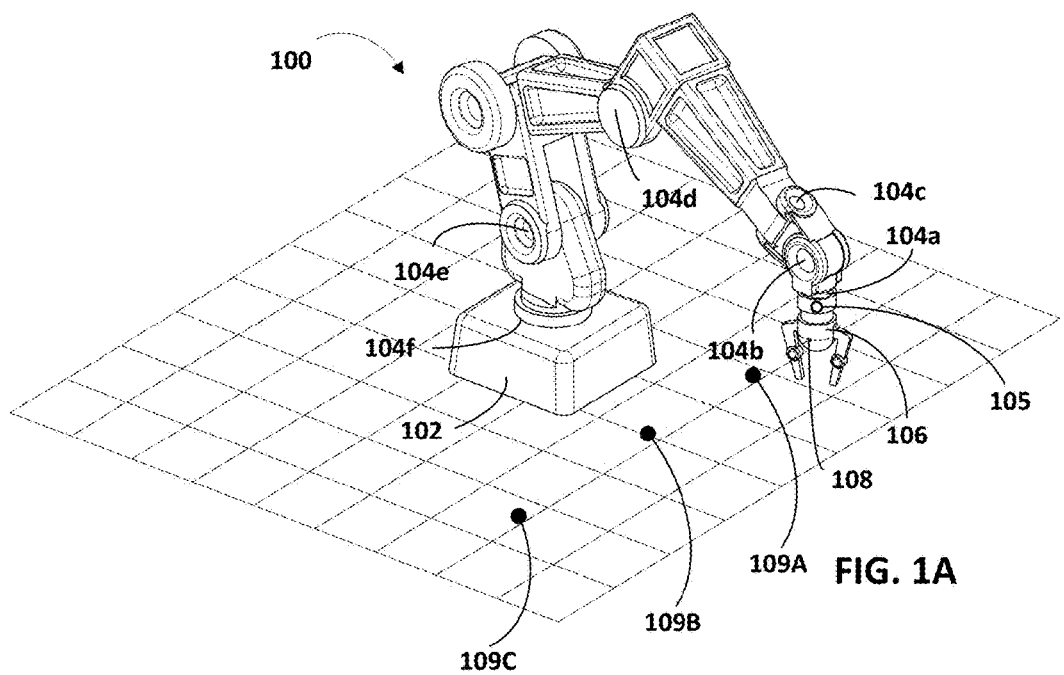
FIG. 1A illustrates an example robot and graphical representations of a first set of waypoints of a reference point of the robot defined in response to multiple waypoint user interface inputs initiated by a user during physical manipulation of the robot.

FIG. 1A illustrates an example robot 100 in a form often referred to as a "robot arm". Robot 100 includes a base 102 and a plurality of joints, six of which are referenced in FIG. 1A with 104a-f. One or more (e.g., all) of the joints 104a-f may be independently controllable by a respective actuator, although this is not required. As used herein, an "actuator" of a robot may refer to motors (e.g., servo motors), pumps (e.g., air or liquid), pistons, drives, or other components that may create and/or undergo propulsion, rotation, and/or motion. In some instances, the more joints and/or actuators that robot 100 has, the more degrees of freedom of movement it may have.

Robot 100 also includes an end effector 106. As used herein, "end effector" may refer to a variety of tools that may be operated by robot 100 in order to accomplish various tasks. In FIG. 1A and other Figures herein, for example, end effector 106 takes the form of a claw with two opposing "fingers" or "digits." The claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, and so forth. In some implementations, end effector 106 may be removable, and various types of modular end effectors may be installed onto robot 100, depending on the circumstances.

End effector 106 may define an abstract reference point 108. Reference point 108 may be a point of end effector 106 that traverses a particular path when robot 100 moves between sites. A reference point of a robot is a point of reference for indicating a position of the robot. For example, the reference point 108 indicates the position of end effector 106 and enables a particular position for the end effector 106 to be defined with reference to the reference point 108. For instance, the particular position may be defined as Cartesian coordinates for the reference point 108 at the particular position and/or as position values for the joint 104a-f when the reference point 108 is at the particular position. In some implementations, reference point 108 may be a center of gravity of end effector 106, and/or a point near where end effector 106 attaches to robot 100, though this is not required. It is noted that the reference point of a "robot arm" is often a point of an end effector of the robot arm. However, a reference point may be defined at other locations for other robots.

Robots typically, and robot 100 in particular, may have multiple degrees of freedom of movement. For example, each of the joints 104a-f may include an independently controllable servo motor that enables controllable rotation of a respective of the joints 104a-f about a respective axis. For instance, each servo motor may be selectively driven and the angular velocity of each servo motor may be independently controllable. Accordingly, it is possible for robot 100 to traverse any one of a plurality of possible paths when moving reference point 108 from a first location to a second location. For instance, to move the reference point 108 from its location illustrated in FIG. 1A to a location indicated by waypoint 109C of FIG. 1A, the robot 100 may traverse the reference point 108 along a straight line path (i.e., the path 110 illustrated in FIG. 1B), one or more arcuate paths, along a sinusoidal path, or along other paths.

Moreover, the independently controllable actuators of the robot 100 enable the robot 100 to traverse along the same path in multiple ways. For example, the independently controllable actuators may enable the reference point 108 of the end effector 106 to traverse along the same path with any set of one or more of a plurality of achievable parameters for movement characteristics along the path. For instance, the independently controllable actuators may enable the reference point 108 to traverse along a particular path at a first constant velocity (no acceleration) along the entire path, or at a distinct second constant velocity along the entire path.

Also, for instance, the independently controllable actuators may enable the reference point 108 to traverse along the particular path with an increasing velocity and positive constant or variable acceleration or with a decreasing velocity and negative constant or variable acceleration. Also, for instance, the independently controllable actuators may each have controllable mechanical impedances and may enable the reference point 108 to traverse along the particular path with a high mechanical impedance (e.g., strong resistance to external forces) or low mechanical impedance (e.g., low resistance to external forces).

As described in detail herein, disclosed techniques enable generation of one or more parameters for one or more corresponding movement characteristics along at least a portion of a trained path based on spatial proximity of a plurality of sequential waypoints corresponding to the portion of the trained path. The generated parameters represent a subset of one or more of a plurality of achievable parameters for the movement characteristics along the trained path.

Robot 100 also includes a user interface element 105 located on an exterior surface of the robot 100 between joint 104A and end effector 106. In some implementations where the end effector 106 is removably attached, the user interface element 105 may be located near an end effector attachment area where the end effector 106 may be attached and removed. In other implementations, the user interface element 105 may be provided on the end effector 106 itself, or on another component of the robot 100 such as base 102, an area between operational component 104f and 104e, etc. In yet other implementations, the user interface element 105 may be located remote from the robot 100, such as a virtual user interface element provided via a tablet or other computing device. In yet other implementations, the user interface element 105 may be absent and a user may provide spoken input, gestures, and/or other user interface input to effectuate defining waypoints based on provided user interface input.

The illustrated user interface element 105 may be, for example, a mechanical push-button or a non-mechanical touch-sensitive button. For example, the mechanical push-button may be a spring-biased push-button switch that provides haptic feedback to enable a user to ascertain whether the push-button is actuated. Also, for example, the non-mechanical touch-sensitive button may be a capacitive touch-sensitive element that may optionally communicate with one or more components to provide haptic (e.g., vibration), visual, audible, and/or other feedback to enable a user to ascertain when and/or how the element has been actuated.

In the example of FIG. 1A, the user may actuate (e.g., "tap") the user interface element 105 in a first manner to define each of a plurality of waypoints 109A, 109B, 109C (and optionally an unillustrated waypoint at the depicted location of reference point 108). For example, the user may actuate the user interface element 105 at the depicted location of reference point 108 to define a first waypoint at that location. The user may then physically manipulate the robot such that the reference point 108 is positioned at the waypoint 109A. The user may actuate the user interface element 105 at that position to define the waypoint 109A. The user may then physically manipulate the robot such that the reference point 108 is positioned at the waypoint 109B. The user may actuate the user interface element 105 at that position to define the waypoint 109B. The user may then physically manipulate the robot such that the reference point 108 is positioned at the waypoint 109C. The user may actuate the user interface element 105 at that position to define the waypoint 109C.

In some implementations, the robot 100 may be in a gravity-compensated mode during all or portions of physical manipulations of the robot 100 by the user described herein. The gravity-compensated mode may facilitate manual movement of the robot 100 by the user. In some versions of those implementations, the amount of gravity-compensation may optionally vary to provide haptic feedback to the user when the user is approaching limits of one or more joints 104a-f, such as positional operational limits. The robot 100 may transition into the gravity-compensated mode in response to a user interface indication that the user desires to train the robot 100. For example, the user interface indication may be actuation of the user interface element 105 for the first time, another manner of actuation of the user interface element 105 to indicate a "start" of training, a spoken command (e.g., "train path"), and/or other user interface indication.

Figure 7:
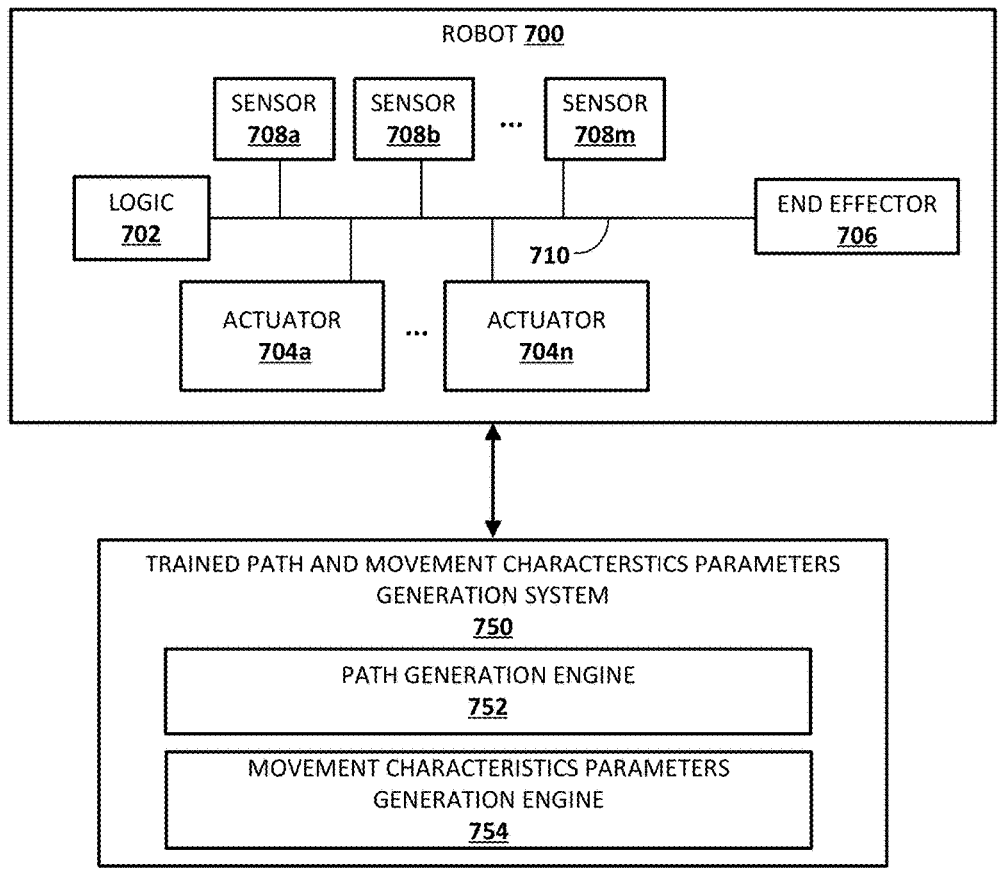
FIG. 7 illustrates an example environment in which disclosed techniques may be implemented.

In response to each instance of actuation of the user interface element 105, a system (e.g., trained path and movement characteristics parameters generation system 750 of FIG. 7) may store a waypoint that defines the position of the reference point 108 at that instance. For example, in the preceding example the system may store one or more values that define the positions for waypoints 109A, 109B, and 109C. The waypoint indications may be determined, for example, based on sensor output of one or more sensors of the robot 100 and/or other feedback signal of the robot 100. For example, the waypoint indications may be determined based on sensor outputs of sensors of the joints 104a-f that each provide an indication of a position of a respective of the joints 104a-f in substantially real time. For example, sensor output of a servo motor that controls a joint may provide an indication of a position of the servo motor based on readings from a Hall-Effect sensor or other sensor of the servo motor.

The stored waypoints may be defined in various manners, such as in joint space and/or in Cartesian/configuration space. For example, a waypoint defined in joint space may be a vector of values that define the positions of each of the joints 104a-f. For instance, a waypoint defined in joint space for waypoint 109B may define the position for each of the joints 104a-f when the reference point 108 is positioned at waypoint 109B and the user interface element 105 is actuated. Also, for example, a waypoint defined in Cartesian space for waypoint 109B may utilize coordinates (e.g., "X", "Y", and "Z" coordinates) for the waypoint 109B that define a position of the reference point 108 (relative to a reference location) when the reference point 108 is positioned at waypoint 109B. For instance, the system may utilize forward and/or inverse kinematics equations for the robot 100 to convert the position for each of joints 104a-f when the reference point 108 is positioned at waypoint 109B into a Cartesian space coordinate.

Figure 1B:
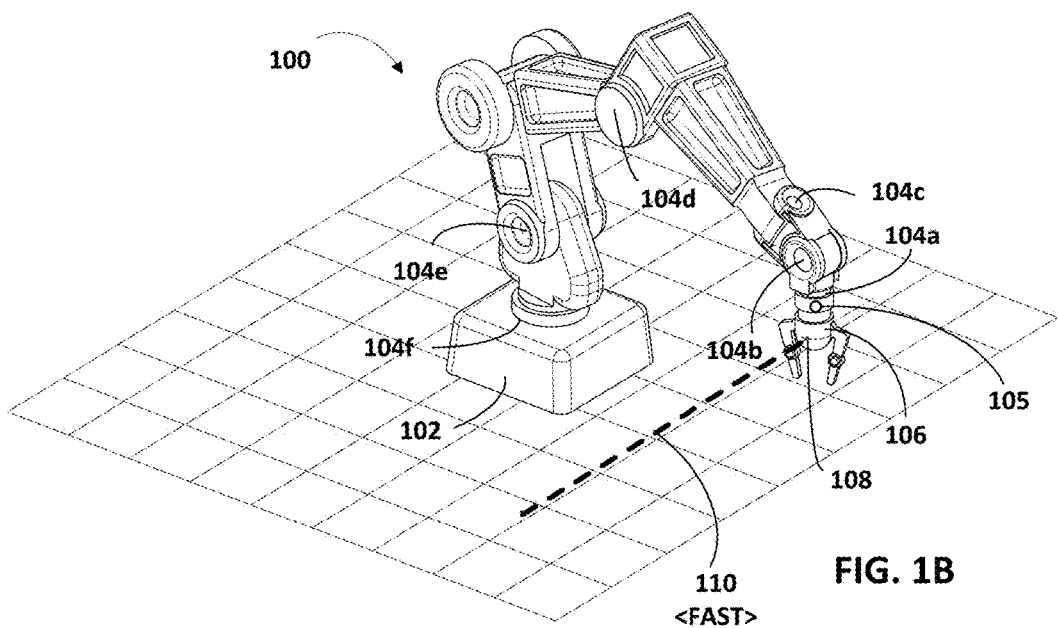
FIG. 1B illustrates the example robot of FIG. 1A and illustrates a waypoint trained path generated based on the first set of waypoints of FIG. 1A and illustrates an indication of a generated parameter for a movement characteristic for the waypoint trained path.

The system utilizes the waypoints stored in response to actuations of the user interface element 105 to generate a waypoint trained path for the robot 100. For example, FIG. 1B illustrates a waypoint trained path 110 generated based on the multiple waypoint indications of FIG. 1A. The waypoint trained path 110 passes through each of the waypoints of FIG. 1A (109A, 109B, 109C, and the waypoint at the illustrated position of the reference point 108) and is the shortest path (in Cartesian space) through those waypoints. It is noted that the waypoint trained path 110 may vary from the actual path that was traversed by the reference point 108 in response to the user moving the reference point 108 to the various waypoints. This is because the waypoint trained path is generated in view of the waypoints defined in response to actuation of the user interface element 105 and in view of one or more optimization parameters (e.g., shortest path). Accordingly, generating the waypoint trained path in view of the optimization parameters may result in a waypoint trained path that will not necessarily fully conform to the actual path traversed by the reference point 108 in moving of the reference point 108 by the user.

The generated waypoint trained path may be defined in various manners, such as in joint space and/or in Cartesian/configuration space. For example, a joint space waypoint trained path may be a plurality of vectors that collectively define the path, such as vectors of values, with the values of each of the vectors defining the positions of each of the joints 104a-f at a position along the waypoint trained path. For instance, a joint space representation of the path 110 may define position values for each of the joints 104a-f at each of a plurality of instances to achieve traversal of the reference point 108 along the path 110. Also, for example, a Cartesian space waypoint trained path may be a plurality of coordinates that collectively define the waypoint trained path.

Various techniques may be utilized in generating a waypoint trained path based on stored waypoints. In some implementations, the system generates the waypoint trained paths using the waypoints as constraints and based on one or more optimization parameters. For example, the system may generate a waypoint trained path that passes through each of the defined waypoints (or "near" the waypoints) and that is optimized to achieve the shortest path in Cartesian space. Also for example, the system may generate a waypoint trained path that passes through each of the defined waypoints (or "near" the waypoints (e.g., trajectory smoothing to prevent hard stops at waypoints)) and that is optimized to be traversed in the shortest time. In some implementations, optimizing a path to be traversed in the shortest time may comprise determining the most direct path in joint space of the robot 100, which may not be the most direct path in Cartesian space. Other constraints and/or optimization parameters may be taken into account. For example, obstacles in the environment may be taken into account and the waypoint trained path generated so that such obstacles are avoided. Also, for example, the waypoint trained path may be generated in view of constraints on one or more of the joints 104a-f and/or the actuators controlling those joints, such as positional constraints (e.g., to ensure the path can be "reached" by the reference point 108).

The system also generates one or more parameters for one or more movement characteristics for the waypoint trained path. The system generates the parameter(s) for a portion of a waypoint trained path based on spatial proximity of a plurality of the sequential waypoints corresponding to the portion of the waypoint trained path. For example, with reference to FIG. 1B, a "fast" parameter for a velocity movement characteristic of the path 110 may be generated based on the spatial proximity of the waypoints 109A, 109B, and 109C (and the optional waypoint at the illustrated position of reference point 108).

Various techniques may be utilized to determine the spatial proximity and/or a parameter based on the spatial proximity. For example, in some implementations the spatial proximity of waypoints may be determined based on dividing the quantity of the waypoints by the collective distance between the waypoints (straight line distances or a distance along the waypoint trained path). For instance, the distance between the position of the reference point 108 illustrated in FIG. 1A and the waypoint 109C may be 2 meters and four waypoints may have been defined over that distance (waypoints 109A-C and an unillustrated waypoint at the illustrated position of reference point 108). A waypoint density of 2 waypoints per meter may be determined (4 waypoints/2 meters). In some implementations, a mapping(s) and/or formula(e) may be utilized to determine a parameter for a movement characteristic that is appropriate for a given proximity of waypoints. For example, two waypoints per meter may be mapped to a "fast" velocity parameter and/or a "low" mechanical impedance parameter. For instance, densities from 0 to 2.0 waypoints per meter may be mapped to a "fast" velocity parameter, densities from 2.0 to 3.0 waypoints per meter may be mapped to a "medium" velocity parameter, and densities greater than 3.0 waypoints per meter may be mapped to a "slow" velocity parameter.

Figure 2A:
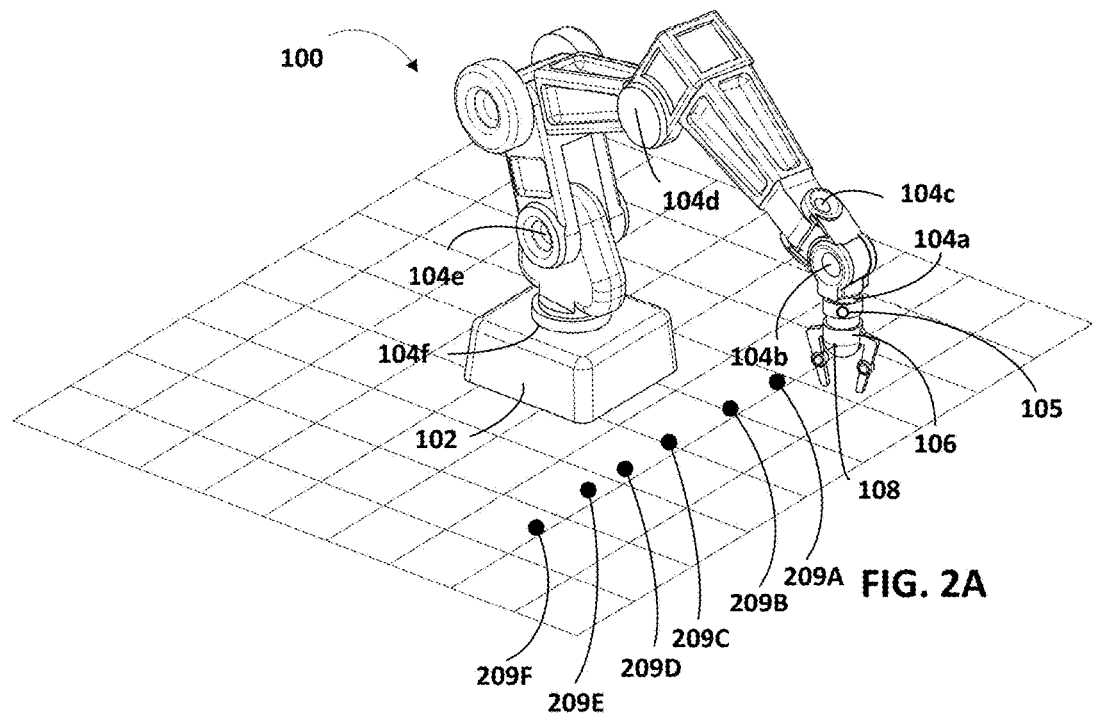
FIG. 2A illustrates the example robot of FIG. 1A and graphical representations of a second set of waypoints of a reference point of the robot defined in response to multiple waypoint user interface inputs initiated by a user during another physical manipulation of the robot.

FIG. 2A illustrates the example robot 100 of FIG. 1A and graphical representations of a second set of waypoints 209A-F defined in response to multiple waypoint user interface inputs initiated by a user during another physical manipulation of the robot 100. The waypoints 209A-F (and an optional additional unillustrated waypoint at the illustrated position of reference point 108) of FIG. 2A may be defined by the user in a manner such as one of those described above with respect to FIG. 1A. The system utilizes the waypoints 209A-F to generate a waypoint trained path 210 (FIG. 2B) for the robot 100 that passes through each of the waypoints of FIG. 2A (209A-F, and the waypoint at the illustrated position of the reference point 108) and is the shortest path (in Cartesian space) through those waypoints. The system may utilize various techniques in generating the path 210, such as those described above with respect to FIG. 1A.

The path 210 substantially conforms to the path 110 of FIG. 1B. However, the system generates a "slow" parameter for a velocity movement characteristic of the path 210, whereas a "fast" parameter is generated for the velocity movement characteristic for the path 110. The system generates the faster velocity characteristic based on there being a higher degree of spatial proximity of the waypoints 209A-F relative to the waypoints 109A-C. In FIG. 2A, six waypoints 209A-F, and an optional additional unillustrated waypoint at the illustrated position of reference point 108, are defined in FIG. 2A over substantially the same distance as the waypoints that were defined in FIG. 1A. Because more waypoints are defined over substantially the same distance, the waypoints 209A-F have a higher degree of spatial proximity than the waypoints 109A-C of FIG. 1A.

In some implementations, the "slow" parameter may be generated based on determining a density of the waypoints and determining the slow parameter based on it being mapped to the determined density. For example, the quantity of the waypoints may be divided by the collective distance between the waypoints. For instance, the distance between the position of the reference point 108 illustrated in FIG. 2A and the waypoint 209F may be 2 meters and seven waypoints may have been defined over that distance (waypoints 209A-F and an unillustrated waypoint at the illustrated position of reference point 108). A waypoint density of 3.5 waypoints per meter may be determined (7 waypoints/2 meters). In some implementations, a mapping(s) and/or formula(e) may be utilized to determine a parameter for a movement characteristic that is appropriate for a given proximity of waypoints. For example, 3.5 waypoints per meter may be mapped to a "slow" velocity parameter and/or a "high" mechanical impedance parameter.

Figure 2B:
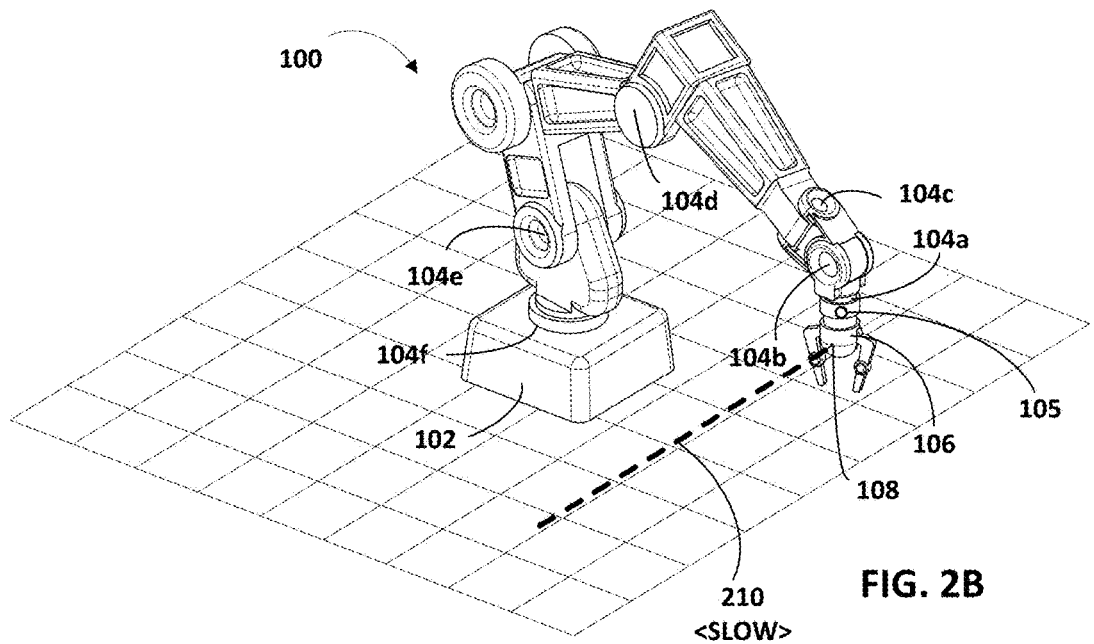
FIG. 2B illustrates the example robot of FIG. 1A and illustrates a waypoint trained path generated based on the second set of waypoints of FIG. 2A and illustrates an indication of a generated parameter for a movement characteristic for the waypoint trained path.

The paths 110 and 210 and associated parameters for movement characteristics of FIGS. 1B and 2B may be automatically assigned to the robot 100 and/or presented to the user for confirmation or alteration (e.g., as described with respect to FIG. 4). The generated parameters may then be utilized by the robot 100 to traverse the waypoint trained path. For example, control commands may be generated by the robot 100 to cause actuators of the robot 100 to traverse the path in accordance with a generated parameter for a velocity movement characteristic.

The velocity movement characteristic parameters of "fast", "medium", and "slow" may be implemented by the robot 100 in various manners. For example, "fast" may be implemented by the robot 100 by quickly accelerating to the highest velocity possible within the constraints of a trained path and the robot, while decelerating to a lower velocity at the end of the trained path to prevent an overly abrupt stop. Also, for example, "slow" may be implemented by the robot 100 by accelerating to a relatively low speed and maintaining the relatively low speed over the path.

Also, although FIGS. 1B and 2B are described with respect to parameters of "fast", "medium", and "slow", additional and/or alternative parameters may be defined for a velocity movement characteristic. For example, one or more specific velocity values may be defined as a "fast" parameter. For instance, a velocity value of 5.0 m/s may be defined and the robot 100 may implement the parameter by accelerating to 5.0 m/s as fast as possible within the constraints of the robot. Also, for example, a set of velocity values may be defined such as velocity values over time that accelerate to a "fast" constant velocity, maintain the "fast" constant velocity, then decelerate to a slower velocity.

Also, in some implementations, a parameter for a movement characteristic for a portion of a path may be defined for that portion of the path in Cartesian space. For example, a parameter for a velocity movement characteristic for a path defined in Cartesian space may be defined as "fast" or "5.0 m/s" along the Cartesian space defined path. In some other implementations, a parameter may be defined in joint space as a plurality of vectors that define the parameter and that also define the waypoint trained path. For example, as described above, a joint space waypoint trained path may be a plurality of vectors that collectively define the path, such as vectors of values, with the values of each of the vectors defining the positions of each of the actuators of a robot at an instance along the waypoint trained path. The joint space representation may also define the parameter(s) for movement characteristic(s). For example, in some implementations, parameters for velocity and/or acceleration movement characteristics may be defined in joint space by associating timing information with a vector of position values. For instance, timing information that defines one or more rates at which position values of the vector are to be implemented may define the velocity and/or acceleration associated with those position values. Also, for example, in some implementations, parameter values may be paired with one or more of the position values of the vector. For instance, a respective parameter for a mechanical impedance characteristic may be paired with each of the position values of the vector to define the parameters for mechanical impedance along the path.

Figure 3A:
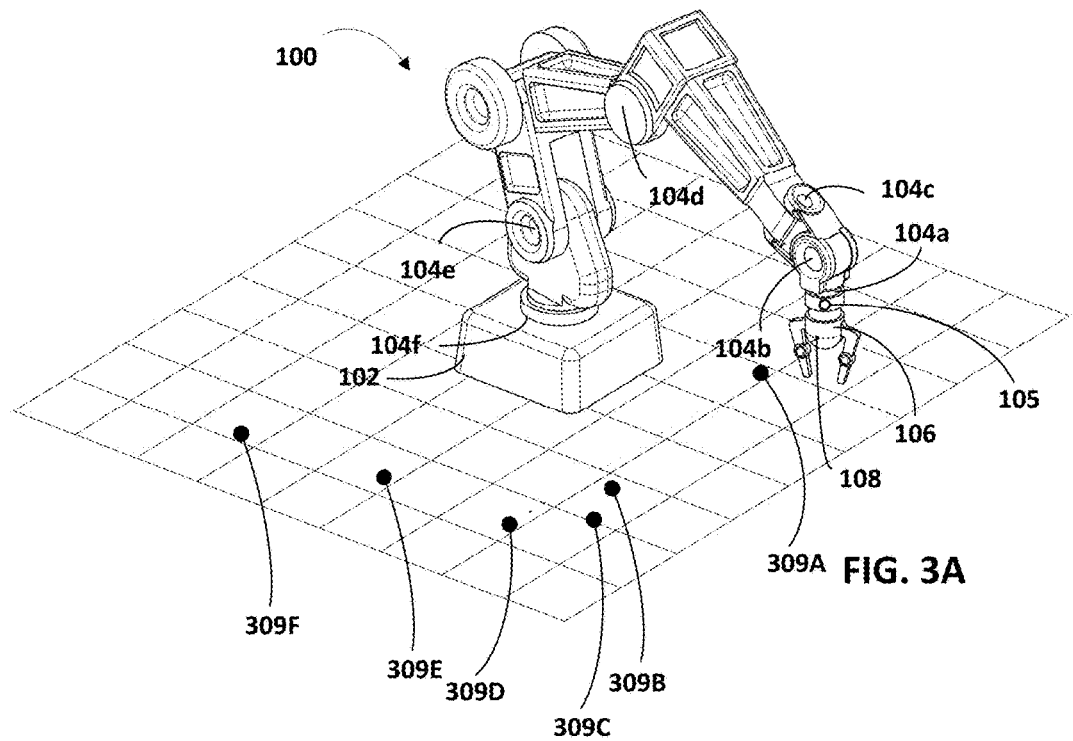
FIG. 3A illustrates the example robot of FIG. 1A and graphical representations of a third set of waypoints of a reference point of the robot defined in response to multiple waypoint user interface inputs initiated by a user during yet another physical manipulation of the robot.
Figure 3B:
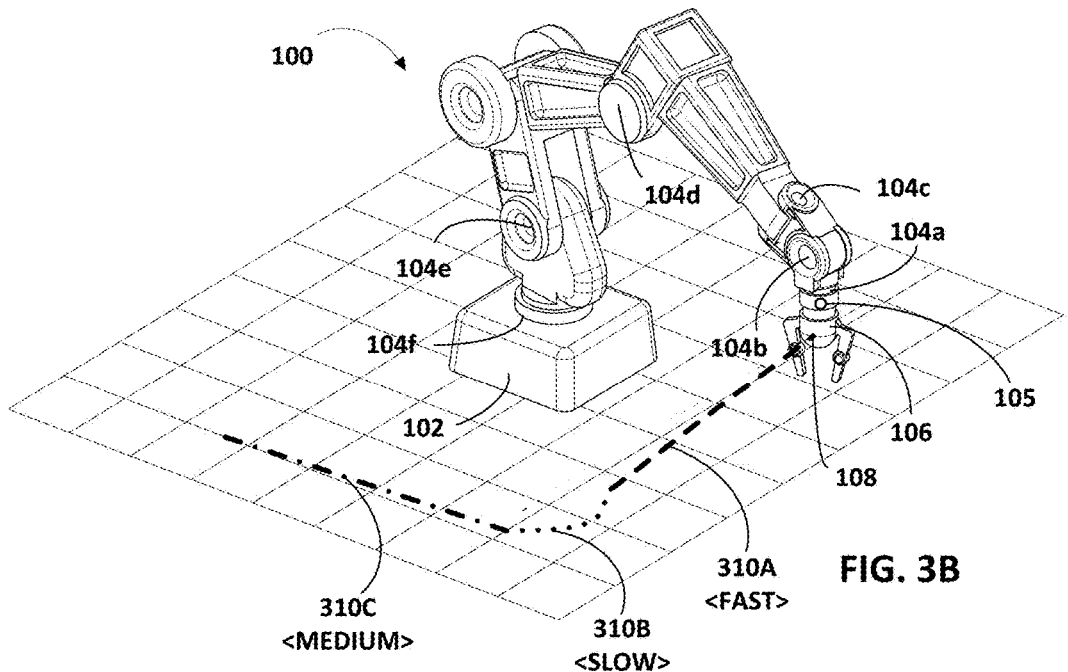
FIG. 3B illustrates the example robot of FIG. 1A and illustrates a waypoint trained path generated based on the third set of waypoints of FIG. 3A and illustrates an indication of generated parameters of a movement characteristic for three portions of the waypoint trained path.

Turning now to FIGS. 3A and 3B, an example is provided of generating a waypoint trained path (the path of FIG. 3B that comprises path portions 310A, 310B, and 310C) and generating three distinct parameters for a velocity movement characteristic for three path portions 310A-C of the trained path. FIG. 3A illustrates waypoints 309A-F of the reference point 108 of the robot 100 defined in response to multiple waypoint user interface inputs initiated by a user during physical manipulation of the robot 100. The waypoints 309A-F (and an optional additional unillustrated waypoint at the illustrated position of reference point 108) of FIG. 3A may be defined by the user in a manner such as one described above with respect to FIG. 1A.

The system utilizes the waypoints 309A-F to generate a waypoint trained path (FIG. 3B) for the robot 100 that comprises path portions 310A-C and that passes through each of the waypoints of FIG. 3A (309A-F, and the waypoint at the illustrated position of the reference point 108). The system may utilize various techniques in generating the path, such as those described above with respect to FIG. 1A.

As indicated by the annotations of FIG. 3B, a "fast" parameter for a velocity movement characteristic is generated for path portion 310A, a "slow" parameter for the velocity movement characteristic is generated for path portion 310B, and a "medium" parameter for the velocity movement characteristic is generated for path portion 310C. The "fast" parameter of portion 310A may be generated based on the spatial proximity of waypoints 309A and 309B, the "slow" parameter may be generated based on the spatial proximity of waypoints 309B, 309C, and 309D, and the "medium" parameter may be generated based on the spatial proximity of waypoints 309D, 309E, and 309F. Generally, the waypoints 309A and 309B are the least "dense", waypoints 309B-D are the most "dense", and the density of waypoints 309D-F is in between those two densities. The system may determine the parameters for the velocity movement characteristics based on mappings of the respective densities to the respective parameters.

Various techniques may be utilized to segment the path and determine distinct parameters for various portions of the path. For example, in some implementations a parameter may be determined for each portion between two consecutive waypoints based on spatial proximity between those two consecutive waypoints. For example, a fast parameter may be determined for the portion between waypoints 309A and 309B based on spatial proximity between those waypoints, a slow parameter may be determined for the portion between waypoints 309B and 309C based on spatial proximity between those waypoints, a slow parameter may be determined for the portion between waypoints 309C and 309D based on spatial proximity between those waypoints, a medium parameter may be determined for the portion between waypoints 309D and 309E based on spatial proximity between those waypoints, and a medium parameter may be determined for the portion between waypoints 309E and 309F based on spatial proximity between those waypoints. Other implementations may involve the clustering of more than two waypoints.

FIG. 4 illustrates an example graphical interface for editing the parameters of movement characteristics for the waypoint trained path of FIG. 3B. The graphical interface of FIG. 4 may be graphically represented on a display of a computing device that is in communication with the robot 100 and/or the trained path and movement characteristics parameters generation system 750. For example, the graphical interface may be generated display of a tablet computing device, a display of a desktop computing device, etc. and may be interacted with via one or more user input interfaces of the computing device.

In FIG. 4, a graphical depiction of the waypoint trained path is provided in combination with a graphical depiction 400 of the robot. The graphical depiction of the waypoint trained path includes three portions each depicted with a different form of dashed line. The first portion is labeled with (1), the second portion is labeled with (2), and the third portion is labeled with (3). Moreover, each label includes indications of parameters for velocity (V), acceleration (A), and mechanical impedance (I) movement characteristics for that portion. For example, the first portion indicates a "fast" parameter for a velocity movement characteristic, an "increasing, then decreasing" parameter for an acceleration movement characteristic, and a "high" parameter for a mechanical impedance characteristic.

An edit portion parameters interface element 490 is also illustrated that enables a user to view the generated parameters for a selected portion and optionally edit those parameters. In FIG. 4, the edit portion parameters interface element 490 is directed to the first portion (1) and may be displayed, for example, in response to selection of the portion (1) via the graphical interface (e.g., "tapping" the portion (1)). The interface element 490 includes an edit velocity parameter interface element 491 that displays the current parameter of "fast" and alternative options of "medium", "slow", and "enter specific velocities" that may be selected by the user to replace the parameter generated based on the spatial proximity of waypoints. Selecting "enter specific velocities" may present an interface element that enables the user to input one or more specific velocities for the portion.

The interface element 490 also includes an edit acceleration parameter interface element 492 that displays the current parameter of "increasing, then decreasing" and alternative options of "increasing", "constant", and "enter specific accelerations" that may be selected by the user to replace the parameter generated based on the spatial proximity of waypoints. The interface element 490 also includes an edit mechanical impedance parameter interface element 493 that displays the current parameter of "high" and alternative options of "medium", "low", and "enter specific impedances" that may be selected by the user to replace the parameter generated based on the spatial proximity of waypoints.

FIG. 5 illustrates an example graphical interface that enables a user to provide user interface inputs that define waypoints for a robot, and illustrates two example waypoints 509A and 509B defined via the graphical interface. The graphical interface of FIG. 5 may be graphically represented on a display of a computing device, such as a display of a tablet computing device, a display of a desktop computing device, etc. The interface elements 582, 584 and/or the graphical depiction 500 of a robot may be interacted with via one or more user input interfaces of the computing device. For example, when provided on a touch sensitive display of a tablet computing device, the graphical user interface element 582 may be selected by "tapping" the display.

The graphical interface of FIG. 5 is an example of an interface that may be used to define waypoints. A waypoint trained path and parameters for movement characteristics for the waypoint trained path may be generated based on the waypoints defined via the FIG. 5 interface and may be generated in a manner similar to that described above with respect to FIGS. 1A-3B. The example interface of FIG. 5 may be used in addition to or as an alternative to defining waypoints by physically manipulating the robot 100 as described with respect to FIGS. 1A-3B.

FIG. 5 includes a graphical depiction 500 of the robot. A user may utilize one or more user interface input devices to reposition the graphical depiction 500 of the robot and select interface element 582 at a position of the graphical depiction 500 to define a waypoint. For example, the user may "tap and drag" the end effector of the graphical depiction 500 to a desired position and "tap" the interface element 582 to define a waypoint at that position. FIG. 5 also includes an additional interface element 584 that enables the user to enter specific coordinates for a waypoint. For example, the user may enter values for an X, Y, and Z coordinate system to define a waypoint via the graphical interface of FIG. 5.

Figure 6:
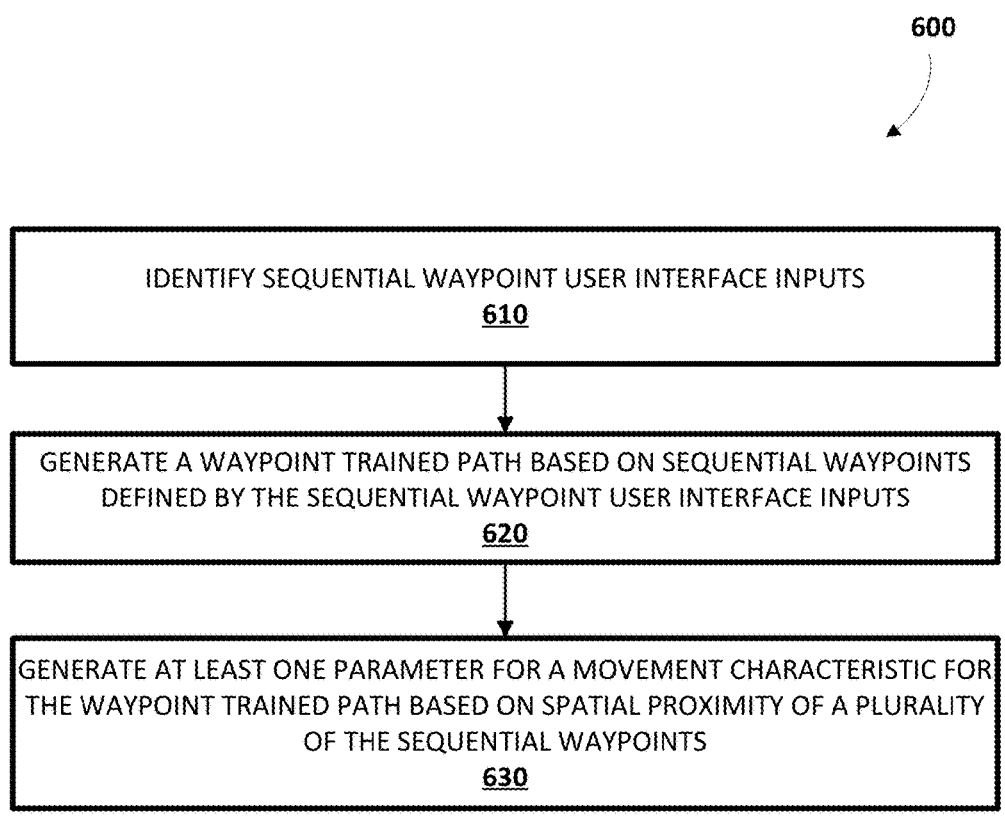
FIG. 6 depicts a flow chart illustrating an example method of generating a trained path for a robot based on waypoints defined by a user and generating one or more parameters for one or more movement characteristics of the robot along the trained path.

FIG. 6 depicts a flow chart illustrating an example method of generating a trained path for a robot based on waypoints defined by a user and generating one or more parameters for one or more movement characteristics of the robot along the trained path. For convenience, the operations of the flow chart are described with reference to a system that performs the operations. This system may include various components of various computer systems, such as trained path and movement characteristics parameters generation system 750 in FIG. 7. Moreover, while operations of method 600 are shown in a particular order, this is not meant to be limiting. One or more operations may be reordered, omitted or added.

At block 610, the system identifies sequential waypoint user interface inputs. For example, the system may identify a plurality of waypoint user interface inputs in response to sequential instances of a user physically manipulating the robot and actuating a user interface element and/or in response to the user providing waypoint user interface inputs via a graphical interface. The waypoint interface inputs each define a waypoint and the system may store the sequential waypoints.

At block 620, the system generates a waypoint trained path based on sequential waypoints defined by the sequential waypoint user interface inputs of block 610. In some implementations, the system generates the waypoint trained paths using the waypoints as constraints and based on one or more optimization parameters. For example, the system may generate a waypoint trained path that passes through each of the defined waypoints (or "near" the waypoints) and that is optimized to achieve the shortest path in Cartesian space. Also for example, the system may generate a waypoint trained path that passes through each of the defined waypoints (or "near" the waypoints (e.g., trajectory smoothing to prevent hard stops at waypoints)) and that is optimized to be traversed in the shortest time. Other constraints and/or optimization parameters may be taken into account. For example, obstacles in the environment may be taken into account and the waypoint trained path generated so that such obstacles are avoided.

At block 630, the system generates at least one parameter for a movement characteristic for the waypoint trained path based on spatial proximity of a plurality of the sequential waypoints. Various techniques may be utilized to determine the spatial proximity and/or a parameter based on the spatial proximity. For example, in some implementations the system may determine the spatial proximity of waypoints for a portion of the path based on dividing the quantity of the waypoints corresponding to that portion by the collective distance between the waypoints (straight line distances or a distance along the waypoint trained path). In some implementations, a mapping(s) and/or formula(e) may be utilized to determine a parameter for a movement characteristic that is appropriate for a given proximity of waypoints. For example, spatial proximities from 0 to 2.0 waypoints per meter may be mapped to a "fast" velocity parameter, spatial proximities from 2.0 to 3.0 waypoints per meter may be mapped to a "medium" velocity parameter, and spatial proximities greater than 3.0 waypoints per meter may be mapped to a "slow" velocity parameter. In some implementations, parameters may be determined for a plurality of movement characteristics.

The waypoint trained path and the at least one parameter for the movement characteristic may be provided to a robot for implementation by the robot and/or to a robot programming application to enable the user to edit the trained paths and/or parameters via the robot programming application.

FIG. 7 is a schematic diagram of an example environment in which disclosed techniques may be implemented. A robot 700 may be in communication with a trained path and movement characteristics parameters generation system 750. Robot 700 may take various forms, including but not limited to a robot arm similar to robot 100 described above, a humanoid form, an animal form, a wheeled device, a submersible vehicle, an unmanned aerial vehicle ("UAV"), and so forth. In various implementations, robot 700 may include logic 702. Logic 702 may take various forms, such as one or more processors, one or more field-programmable gate arrays ("FPGA"), one or more application-specific integrated circuits ("ASIC"), one or more so-called "real time controllers," and so forth.

In various implementations, logic 702 may be operably coupled with one or more actuators 704a-n and/or one or more sensors 708a-m, e.g., via one or more buses 710. Sensors 708a-m may take various forms, including but not limited to light sensors, pressure sensors, pressure wave sensors (e.g., microphones), proximity sensors, accelerometers, gyroscopes, thermometers, barometers, and so forth. While sensors 708a-m are depicted as being integral with robot 700, this is not meant to be limiting. In some implementations, one or more sensors 708a-m may be located external to robot 700, e.g., as standalone units or as part of training path system 750.

Logic 702 may provide control commands to the actuators 704a-n to accomplish one or more programmed tasks. Those control commands include commands that direct the actuators 704a-n to move to traverse one or more trained paths generated according to techniques described herein and that direct the actuators 704a-n to move along the trained paths so that parameters for movement characteristics are achieved along the trained path.

Logic 702 may further provide control commands to the actuators 704a-n to enable the robot 700 to be in a gravity-compensated mode during all or portions of physical manipulations of the robot by the user as described herein. Moreover, the logic 702 may optionally determine positions of one or more actuators 704a-n, end effector 706, and/or a reference point based on sensor feedback and/or other techniques and provide indications of the positions to system 750 to enable the system 750 to store waypoints based on position(s) of the actuators 704a-n during training of a path of the robot 700.

Trained path and movement characteristics parameters generation system 750 may include one or computing systems connected by one or more networks (not depicted) and may determine trained paths and parameters for movement characteristics for the trained paths according to techniques described herein. An example of such a computing system is depicted schematically in FIG. 9. Various modules or engines may be implemented as part of training path system 750 as software, hardware, or any combination of the two. For example, in FIG. 7, system 750 includes a path generation engine 752 and a movement characteristics parameters generation engine 754.

The path generation engine 752 generates a waypoint trained path based on waypoints provided by robot 700 and/or a programming application. For example the path generation engine 752 may generate a waypoint trained path based on waypoints provided by robot 700 during physical manipulation of the robot 700 by a user in response to user actuation of a user interface element in association with the physical manipulation of the robot 700. The user interface element may be a physical and/or graphical interface element and may be located on the robot 700 or remote from the robot 700, such as a graphical interface element on a computing device remote from the robot 700.

The path generation engine 752 utilizes stored waypoints to generate a waypoint trained path for the robot 700. Various techniques may be utilized by the path generation engine 752 in generating a waypoint trained path based on stored waypoints, such as techniques described herein. In some implementations, the path generation engine 752 generates the waypoint trained path using the waypoints as constraints and based on one or more optimization parameters.

Movement characteristics parameters generation engine 754 may be configured to generate at least one parameter for a movement characteristic of at least a portion of the waypoint trained path based on spatial proximity of stored waypoints corresponding to the portion of the path. For example, in some implementations the movement characteristics parameters generation engine 754 may determine the spatial proximity of waypoints for a portion of the path based on dividing the quantity of the waypoints corresponding to that portion by the collective distance between the waypoints. In some implementations, the movement characteristics parameters generation engine 754 utilizes mapping(s) and/or formula(e) to determine a parameter for a movement characteristic that is appropriate for a given proximity of waypoints. In some implementations, the movement characteristics parameters generation engine 754 parameters may be determined for a plurality of movement characteristics.

The system 750 may provide trained paths and parameters for movement characteristics to the robot 700 for implementation of the trained paths in accordance with the parameters via commands generated by logic 702 in performing one or more tasks. The system 750 may additionally and/or alternatively provide trained paths to a robot programming application to enable a user to edit the trained paths and/or parameters via the robot programming application. For example, the robot programming application may provide a graphical interface such as the interface of FIG. 5 that enables a user to edit generated parameters for all or portions of a trained path.

While robot 700 and system 750 are depicted separately in FIG. 7, this is not meant to be limiting. In various implementations, one or more aspects depicted in FIG. 7 as implemented on one of robot 700 or system 750 may be implemented on the other, may be distributed across both, and/or may be distributed across one or both in combination with other components not depicted in FIG. 7. In implementations where robot 700 and system 750 are separate, they may communicate over one or more wired or wireless networks (not depicted) or using other wireless technology, such as radio, Bluetooth, infrared, etc. In other implementations, system 750 may be implemented entirely or in part using logic 702 of robot 700.

Figure 8:
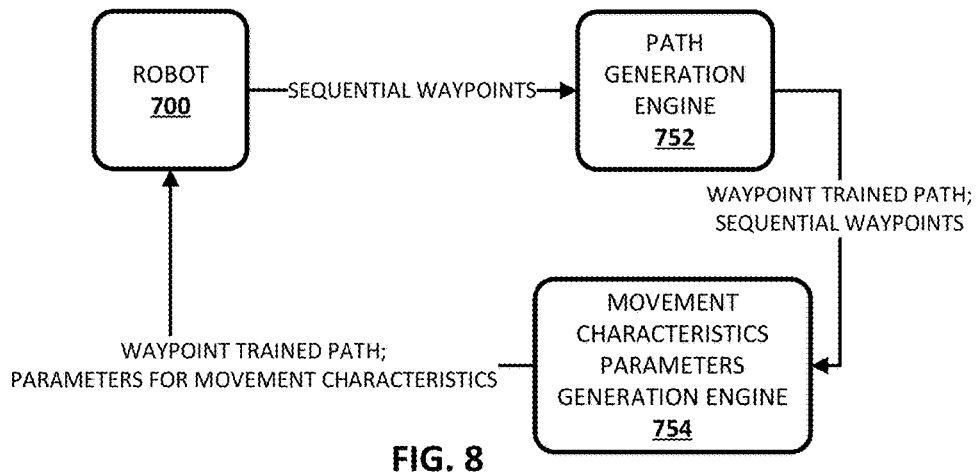
FIG. 8 illustrates an example of generating a trained path for a robot based on waypoints defined by a user, generating one or more parameters for one or more movement characteristics of the robot along the trained path, and using the trained path and the parameters to control a robot.

FIG. 8 illustrates an example of generating a trained path for the robot 700 based on waypoints defined by a user, generating one or more parameters for one or more movement characteristics of the robot along the trained path, and using the trained path and the parameters to control the robot 700.

The robot 700 provides a plurality of sequential waypoints to the path generation engine 752 in response to sequential instances of a user physically manipulating the robot and actuating a user interface element to define the sequential waypoints. The path generation engine 752 generates a waypoint trained path based on the sequential waypoints. In some implementations, the path generation engine 752 generates the waypoint trained path using the waypoints as constraints and based on one or more optimization parameters. For example, the path generation engine 752 may generate a waypoint trained path that passes through each of the defined waypoints (or "near" the waypoints) and that is optimized to achieve the shortest path in Cartesian space.

The path generation engine 752 provides the generated waypoint trained path and the sequential waypoints to the movement characteristics parameters generation engine 754. The engine 754 generates at least one parameter for a movement characteristic for the waypoint trained path based on spatial proximity of a plurality of the sequential waypoints. Various techniques may be utilized to determine the spatial proximity and/or a parameter based on the spatial proximity. For example, in some implementations the engine 754 may determine the spatial proximity of waypoints for a portion of the path based on dividing the quantity of the waypoints corresponding to that portion by the collective distance between the waypoints and may utilize a mapping(s) and/or formula(e) to determine a parameter for a movement characteristic that is appropriate for a given proximity of waypoints. The engine 754 provides the waypoint trained path and the at least one parameter for the movement characteristic to the robot 700 for implementation by the robot 700. The robot 700 uses the waypoint trained path and the at least one parameter to generate control commands to drive actuators of the robot to cause a reference point of the robot to traverse the trained path in accordance with the at least one parameter.

Figure 9:
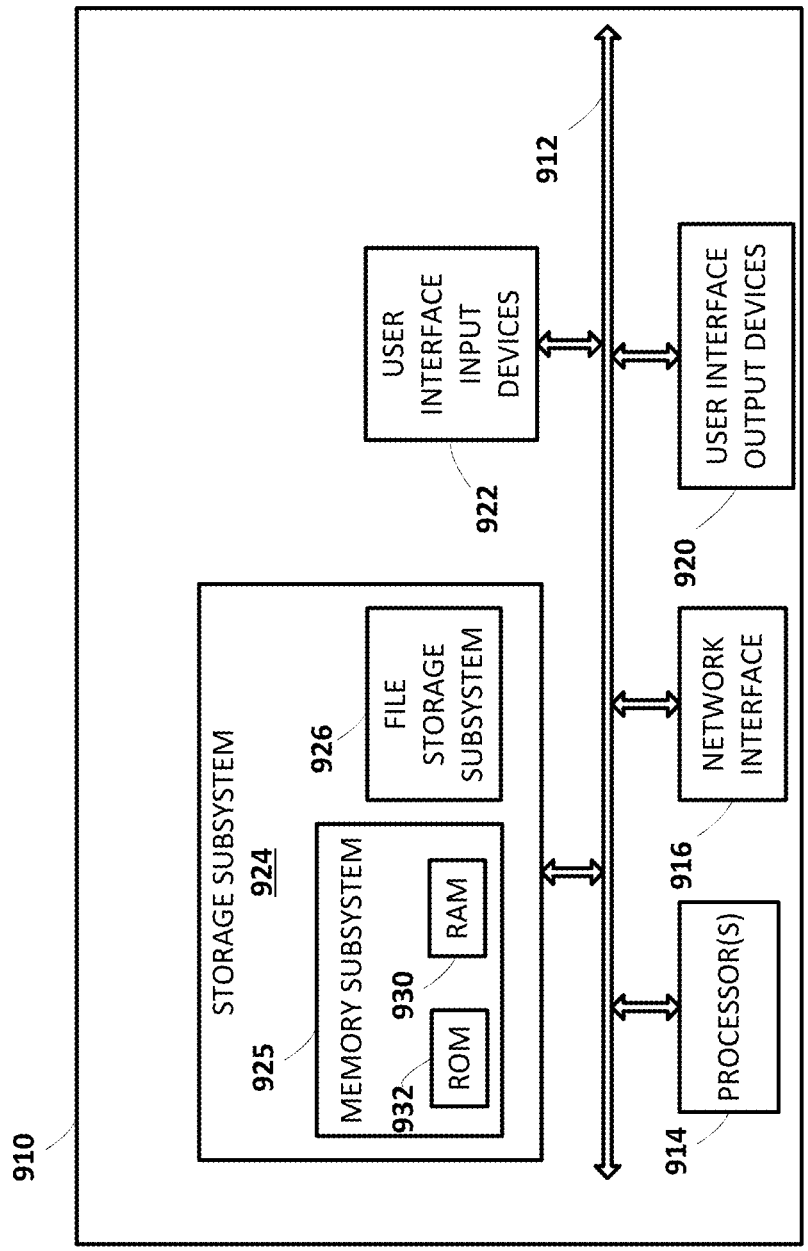
FIG. 9 schematically depicts an example architecture of a computer system.

FIG. 9 is a block diagram of an example computer system 910. Computer system 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform selected aspects of method 600, and/or to implement one or more aspects of logic 702, engine 752, and/or engine 754. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a CD-ROM drive, an optical drive, or removable media cartridges. Modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
identifying, by one or more processors, a plurality of sequential waypoint user interface inputs initiated by a user, the waypoint user interface inputs defining waypoints of a reference point of a robot;
generating, by one or more of the processors based on one or more optimization parameters, a waypoint trained path for the robot based the sequential waypoints defined by the waypoint user interface inputs,
  wherein the waypoint trained path defines a path to be traversed by the reference point of the robot, and
  wherein the waypoint trained path traverses through or near each of the sequential waypoints defined by the waypoint user interface inputs;
determining, by one or more of the processors, spatial proximity of a plurality of the waypoints, defined by the waypoint user interface inputs, corresponding to a portion of the waypoint trained path, the portion being less than an entirety of the waypoint trained path;
generating, by one or more of the processors and after generating the waypoint trained path, at least one parameter for a movement characteristic for the portion of the waypoint trained path,
  wherein the parameter defines the movement characteristic along the portion of the waypoint trained path, and
  wherein generating the parameter is based on the determined spatial proximity of the plurality of the waypoints defined by the waypoint user interface inputs and corresponding to the portion of the waypoint trained path.

2. The method of claim 1, wherein the movement characteristic is selected from the group consisting of velocity, acceleration, and mechanical impedance.

3. The method of claim 2, wherein generating the parameter is based on the spatial proximity of at least a first waypoint of the waypoints to a second waypoint of the waypoints.

4. The method of claim 3, wherein the movement characteristic is the velocity and wherein the generated parameter of the velocity when the first waypoint is a first distance from the second waypoint is indicative of a greater velocity than when the first waypoint is a second distance from the second waypoint, the first distance being greater than the second distance.

5. The method of claim 3, wherein the movement characteristic is the acceleration and wherein the generated parameter of the acceleration when the first waypoint is a first distance from the second waypoint is indicative of a greater acceleration than when the first waypoint is a second distance from the second waypoint, the first distance being greater than the second distance.

6. The method of claim 3, wherein the movement characteristic is the mechanical impedance and wherein the generated parameter of the mechanical impedance when the first waypoint is a first distance from the second waypoint is indicative of greater mechanical impedance than when the first waypoint is a second distance from the second waypoint, the first distance being greater than the second distance.

7. The method of claim 1, further comprising:
generating, by one or more of the processors, an additional parameter for the movement characteristic along an additional portion of the waypoint trained path;
wherein generating the additional parameter is based on the spatial proximity of the waypoints corresponding to the additional portion, wherein at least one of the waypoints corresponding to the additional portion is in addition to the waypoints corresponding to the portion.

8. The method of claim 1, further comprising:
generating, by one or more of the processors, an additional parameter for an additional movement characteristic along the portion of the waypoint trained path;
wherein generating the additional parameter is based on the spatial proximity of the plurality of the waypoints corresponding to the portion of the waypoint trained path.

9. The method of claim 8, wherein the movement characteristic is one of velocity and acceleration and wherein the additional movement characteristic is mechanical impedance.

10. The method of claim 1, wherein the parameter is a non-numerical descriptor.

11. The method of claim 1, wherein generating the waypoint trained path comprises:
determining a plurality of position values that define positions of the reference point along the waypoint trained path; and
wherein generating the parameter comprises:
associating the parameter with a plurality of the position values that correspond to the portion of the waypoint trained path.

12. The method of claim 1, wherein generating the waypoint trained path and generating the parameter comprises:
generating a plurality of vectors that collectively define the waypoint trained path and the parameter along the portion of the waypoint trained path, each of the vectors defining a state for each of a plurality of actuators of the robot.

13. The method of claim 1, wherein each of the waypoint user interface inputs initiated by the user is in response to actuation by the user of a user interface element following physical manipulation of the robot by the user to move a reference point of the robot to a respective of the waypoints.

14. The method of claim 1, wherein each of the waypoint user interface inputs initiated by the user is in response to user interface input by the user via a graphical programming application.

15. The method of claim 1, further comprising:
traversing, by the robot, the reference point of the robot along the portion of the waypoint trained path according to the parameter of the movement characteristic.

16. The method of claim 1, wherein generating the waypoint trained path based on the one or more optimization parameters comprises generating the waypoint trained path to achieve a shortest path in Cartesian space.

17. The method of claim 1, further comprising:
generating an additional instance of the waypoint trained path based on additional sequential waypoints defined by additional waypoint user interface inputs;
determining an additional spatial proximity of a plurality of the additional waypoints, defined by the additional waypoint user interface inputs, corresponding to the portion of the additional instance of the waypoint trained path,
  wherein the additional spatial proximity differs from the spatial proximity;
generating an alternative parameter for the movement characteristic for the portion of the additional instance of the waypoint trained path,
  wherein the alternative parameter defines the movement characteristic along the portion of the additional instance of the waypoint trained path and varies from the parameter, and wherein generating the alternative parameter is based on the determined additional spatial proximity of the plurality of the additional waypoints defined by the additional waypoint user interface inputs and corresponding to the portion of the waypoint trained path.

18. A system comprising:
a robot;
a path generation engine configured to:
identify a plurality of sequential waypoint user interface inputs initiated by a user in training a path for the robot, the waypoint user interface inputs defining waypoints of a reference point of the robot;
generate, based on one or more optimization parameters, a waypoint trained path for the robot based on the waypoints defined by the waypoint user interface inputs, the waypoint trained path defining a path to be traversed by the reference point of the robot, and the waypoint trained path traversing through or near each of the sequential waypoints defined by the waypoint user interface inputs;
a movement characteristics parameters generation engine configured to:
determine spatial proximity of a plurality of the waypoints, defined by the waypoint user interface inputs, corresponding to a portion of the waypoint trained path, the portion being less than an entirety of the waypoint trained path;
generate at least one parameter for a movement characteristic for the waypoint trained path,
wherein the parameter defines the movement characteristic along the portion of the waypoint trained path, and
wherein the movement characteristics parameters generation engine generates the parameter based on the determined spatial proximity of the plurality of the waypoints defined by the waypoint user interface inputs and corresponding to the portion of the waypoint trained path.

19. The system of claim 18, wherein the path generation engine is further configured to:
generate an additional parameter for the movement characteristic along an additional portion of the waypoint trained path;
wherein generating the additional parameter is based on the spatial proximity of the waypoints corresponding to the additional portion, wherein at least one of the waypoints corresponding to the additional portion is in addition to the waypoints corresponding to the portion.

20. The system of claim 18, wherein the path generation engine is further configured to:
generate an additional parameter for an additional movement characteristic along the portion of the waypoint trained path;
wherein generating the additional parameter is based on the spatial proximity of the plurality of the waypoints corresponding to the portion of the waypoint trained path.

21. The system of claim 20, wherein the movement characteristic is one of velocity and acceleration and wherein the additional movement characteristic is mechanical impedance.

22. At least one non-transitory computer-readable medium comprising instructions that, in response to execution of the instructions by a computing system, cause the computing system to perform the following operations:
generating, by one or more of the processors based on one or more optimization parameters that seek to achieve a shortest path in Cartesian space, a waypoint trained path for the robot based the sequential waypoints defined by the waypoint user interface inputs,
wherein the waypoint trained path defines a path to be traversed by the reference point of the robot, and
wherein the waypoint trained path traverses through or near each of the sequential waypoints defined by the waypoint user interface inputs;
determining, by one or more of the processors, spatial proximity of a plurality of the waypoints, defined by the waypoint user interface inputs, corresponding to a portion of the waypoint trained path, the portion being less than an entirety of the waypoint trained path;
generating, by one or more of the processors and separate from generating the waypoint trained path, at least one parameter for a movement characteristic for the portion of the waypoint trained path,
wherein the parameter defines the movement characteristic along the portion of the waypoint trained path, and
wherein generating the parameter is based on the determined spatial proximity of the plurality of the waypoints defined by the waypoint user interface inputs and corresponding to the portion of the waypoint trained path.

\* \* \* \* \*